(12) United States Patent
Althaus

(10) Patent No.: US 7,568,335 B2
(45) Date of Patent: Aug. 4, 2009

(54) GAS TURBOGROUP

(75) Inventor: Rolf Althaus, Herrliberg (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 12/073,544

(22) Filed: Mar. 6, 2008

(65) Prior Publication Data

US 2008/0173005 A1 Jul. 24, 2008

Related U.S. Application Data

(63) Continuation of application No. PCT/EP2006/065359, filed on Aug. 16, 2006.

(30) Foreign Application Priority Data

Sep. 9, 2005 (DE) ......................... 10 2005 042 889

(51) Int. Cl.
*F02C 7/12* (2006.01)
*F02C 7/18* (2006.01)
(52) U.S. Cl. ........................... 60/39.17; 60/760; 60/806
(58) Field of Classification Search ................ 60/39.17, 60/752, 760, 806
See application file for complete search history.

(56) References Cited

U.S. PATENT DOCUMENTS

| | | | | |
|---|---|---|---|---|
| 5,782,076 A * | 7/1998 | Huber et al. | ................... | 60/782 |
| 6,065,282 A * | 5/2000 | Fukue et al. | ................... | 60/806 |
| 6,098,395 A * | 8/2000 | North | ........................... | 60/806 |
| 2002/0148213 A1* | 10/2002 | Yu | ............................. | 60/39.17 |
| 2002/0148214 A1* | 10/2002 | Tiemann | ..................... | 60/39.17 |
| 2003/0000222 A1 | 1/2003 | Tsuji | | |
| 2004/0025491 A1* | 2/2004 | Hoffmann et al. | .......... | 60/39.53 |

FOREIGN PATENT DOCUMENTS

| | | |
|---|---|---|
| EP | 0 321 809 B1 | 6/1989 |
| EP | 0 620 362 B1 | 10/1994 |
| EP | 0 669 500 B1 | 8/1995 |
| EP | 0 674 099 A1 | 9/1995 |
| EP | 1 245 804 A1 | 10/2002 |
| GB | 2 236 145 A | 3/1991 |
| GB | 2 373 299 A | 9/2002 |
| WO | WO 97/38219 A1 | 10/1997 |
| WO | WO 97/44575 A1 | 11/1997 |
| WO | WO 03/038255 A1 | 5/2003 |

OTHER PUBLICATIONS

PCT/ISA/210 for PCT/EP2006/065369, Nov. 27, 2006.
PCT/ISA/237 for PCT/EP2006/065369, Nov. 27, 2006.

* cited by examiner

*Primary Examiner*—Ted Kim
(74) *Attorney, Agent, or Firm*—Buchanan Ingersoll & Rooney PC

(57) ABSTRACT

In a gas turbogroup, which comprises a compressor, a first combustion chamber, a first turbine, a second combustion chamber, and a second turbine, the first combustion chamber is arranged downstream of the compressor, the first turbine is arranged downstream of the first combustion chamber, the second combustion chamber is arranged downstream of the first turbine, and the second turbine is arranged downstream of the second combustion chamber, wherein the second combustion chamber has a convectively cooled wall. A cooling air feed line for the second combustion chamber branches from the main flow path of the gas turbogroup downstream of the compressor and upstream of the first combustion chamber. A return line for heated cooling air leads from the second combustion chamber upstream of the first turbine to the main flow path.

13 Claims, 4 Drawing Sheets

GAS TURBOGROUP

RELATED APPLICATIONS

This application claims priority under 35 U.S.C. §119 to German Application No. 10 2005 042 889.4 filed in Germany on 9 Sep. 2005, and as a continuation application under 35 U.S.C. §120 to PCT/EP2006/065359 filed as an International Application on 16 Aug. 2006 designating the U.S., the entire contents of which are hereby incorporated by reference in their entireties.

TECHNICAL FIELD

A gas turbogroup is disclosed.

BACKGROUND INFORMATION

A gas turbogroup with so-called sequential combustion has become known from EP 620 362. In this gas turbogroup, a first turbine is arranged downstream of a first combustion chamber, a second combustion chamber is arranged downstream of the first turbine, and a second turbine is arranged downstream of the second combustion chamber. In this case, the second combustion chamber is constructed as a so-called auto-ignition combustion chamber. The cooling of such a combustion chamber is described in EP 669 500. There, the combustion chamber wall is convectively cooled. The cooling air is introduced into the main flow of the gas turbogroup at the pressure level of the second combustion chamber. In relation to this, WO 03/038255 has described a gas turbogroup in which the second combustion chamber, or low-pressure combustion chamber, is cooled by air which is tapped in an intermediate stage of the compressor. That is to say, the air which is used for cooling the second combustion chamber is supplied at reduced pressure, wherein this pressure is adjusted to the pressure in the second combustion chamber and downstream of the second combustion chamber. In WO 03/038255, operating states of the gas turbogroup are described, in which the pressure build-up inside the compressor is shifted, and the intermediate tapping of cooling air at reduced pressure from the compressor can be problematical.

SUMMARY

According to one aspect, the disclosure is based on the object of disclosing a gas turbogroup of the type mentioned in the introduction in such a way that an alternative to the prior art is created. According to a more specific aspect of the invention, a development of the prior art is to be disclosed. A further object upon which the invention is based can be seen as carrying out cooling of the second combustion chamber so that increased power output and improved efficiency of the gas turbogroup is achieved. A further aspect of the invention is to increase the mass flow and the volumetric flow in the high-pressure section of the gas turbogroup, and especially in the last stages of the compressor. A further effect, which is achieved by means of the invention, is to increase the combustion stability by means of preheating the combustion air during premix combustion in the first combustion chamber, and/or to reduce the formation of nitrogen oxide. A further effect of the invention is to avoid the arrangement of an intermediate tapping point of the compressor.

A gas turbogroup is disclosed, comprising a compressor, a first combustion chamber, a first turbine, a second combustion chamber, and a second turbine, wherein the first combustion chamber is arranged downstream of the compressor, the first turbine is arranged downstream of the first combustion chamber, the second combustion chamber is arranged downstream of the first turbine, and the second turbine is arranged downstream of the second combustion chamber, in which gas turbogroup the second combustion chamber has a convectively cooled wall, wherein a cooling air feed line for the second combustion chamber branches from the main flow path of the gas turbogroup downstream of the compressor and upstream of the first combustion chamber, and in that a return line for heated cooling air leads from the second combustion chamber upstream of the first turbine to the main flow path.

BRIEF DESCRIPTION OF THE DRAWINGS

The disclosure is subsequently explained in more detail based on the exemplary embodiments which are illustrated in the drawings.

Figure 1:
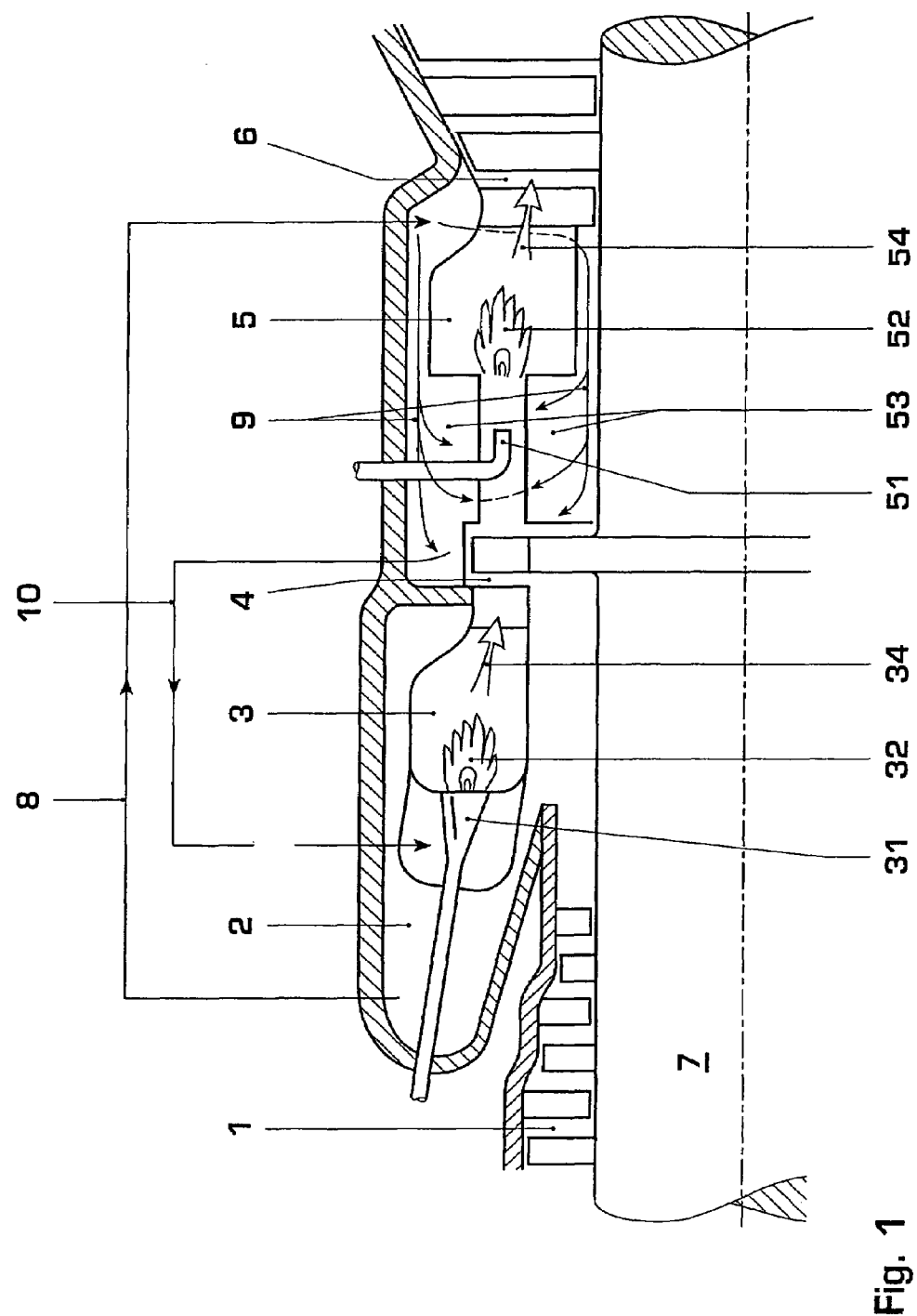
FIG. 1 shows a first exemplary embodiment of the disclosure.

The drawings which are shown are greatly simplified, and elements which are not necessary for the understanding of the disclosure have been omitted. The subsequently described exemplary embodiments are to be purely illustratively understood, and should not be considered as limitations of the disclosure.

DETAILED DESCRIPTION

In an exemplary gas turbogroup, the cooling air for the second combustion chamber is tapped from the main flow path of the gas turbogroup downstream of the compressor and upstream of the first combustion chamber. This cooling air is then guided to the second combustion chamber of the gas turbogroup, and flows over the surface, which faces away from the combustion zone, of the combustion chamber wall of the second combustion chamber. In the process, the combustion chamber wall is convectively cooled by the overflowing cooling air absorbing heat from the combustion chamber wall. The cooling air flow, in one exemplary embodiment of the disclosure, is guided in counterflow towards the hot gas flow, or reaction flow, which flows inside the combustion chamber. The cooling air is heated in the process. After subsequent cooling, the used cooling air is again introduced into the main flow path of the gas turbogroup upstream of the first turbine. In this way, the pressurized and heated cooling air is used in the best possible way for producing mechanical power. In particular, the heat which is tapped from the second combustion chamber is also used for power production.

In one exemplary embodiment of the disclosure, return of the cooling air to the first combustion chamber, or upstream of the first combustion chamber, is carried out. Consequently, more air becomes available for combustion in the first combustion chamber, from which on the one hand a higher power conversion and on the other hand combustion with lower emissions results. Also, the heating of the combustion air by means of the admixing with the heated cooling air improves the combustion stability in the first combustion chamber as the need arises, especially if this is operated with premix burners and a lean fuel-air mixture. In one exemplary development of this embodiment, return of the cooling air to a plenum of the first combustion chamber is carried out. In another development, return of the cooling air to burners of the first combustion chamber is carried out. In particular, the cooling air can be specifically guided to individual burners of the first combustion chamber in order to increase their combustion stability, as a result of which these can act as support burners for the first combustion chamber.

In another exemplary embodiment of the disclosure, return of the heated cooling air from the second combustion chamber to the compressor of the gas turbogroup is carried out, for example upstream of the last one to four stages. Consequently, the cooling air is recompressed, as a result of which pressure losses of the cooling air system are compensated as the need arises. Admittedly, the recompression of the already heated air requires a comparatively large amount of power, but this disadvantage is at least partially compensated by the efficiency of the compressor increasing as a result of the increased volumetric flow in the last compressor stages. Utilization of the cooling air at a high pressure level then ensures improved efficiency of the entire process in net terms.

Alternatively to this, an additional compression of the cooling air can also be carried out in an external auxiliary compressor, which is arranged in the flow path of the cooling air, e.g., in the inflow to the second combustion chamber.

For compensation of possible pressure losses of the cooling air flow, one exemplary embodiment also proves to be suitable, in which at least some of the air which flows from the compressor to the first combustion chamber is directed through a convergent-divergent flow element, and the flow of the used cooling air enters in the region of a flow constriction of this flow element.

In FIG. 1, a first embodiment of the disclosure of a gas turbogroup with sequential combustion, as has become known from EP 620 362, is schematically shown. A gas turbogroup, of which only the section which is necessary for the understanding of the disclosure is shown, comprises a compressor 1, of which the last three stages are shown. From the compressor, compressed combustion air flows into the combustion chamber plenum 2. A combustion chamber 3 is provided with double-cone burners 31, as for example have become known from EP 321 809. The compressed combustion air flows into the combustion chamber 3 through the swirler of the double-cone burners 31. In the burners, the combustion air is admixed with fuel, and this is combusted in the flame 32. In the process, resulting expanded flue gas flows to a first turbine 4 and is partially expanded there, typically with a pressure ratio of about 2. The partially expanded flue gas, which is still at high temperature, and typically contains between 15 and 17 percent oxygen, flows into a second combustion chamber 5. This second combustion chamber, in the embodiment which is shown, is an auto-ignition combustion chamber of the type as has become known for example from EP 669 500. Fuel is admixed in a fuel lance 51 with the partially expanded flue gas which flows from the first turbine 4. Owing to the still high temperature of the flue gas, the fuel is ignited in the partially expanded hot gas at a cross-sectional jump of the combustion chamber, and forms a combustion zone 52. In the process, resulting flue gas 54 is expanded in the turbine 6 essentially up to ambient pressure. The turbines and the compressor are arranged on a common shaft 7, via which a useful output, for example for driving a generator, can also be tapped off. The first combustion chamber and the turbines of the gas turbogroup are cooled in a manner known per se, wherein the cooling air is admixed with the hot gas after cooling has been carried out. The cooling system of the second combustion chamber 5 is shown in more detail in the figure. A cooling air feed line 8 branches from the first combustion chamber plenum 2 and directs compressed air to a downstream end of the combustion chamber plenum 53 of the second combustion chamber 5. This air, as cooling air flow 9, flows through the combustion chamber plenum 53 in counterflow to the hot gas flow inside the combustion chamber, and in the process flows around the combustion chamber wall of the second combustion chamber 5. In doing so, the cooling air flow 9 absorbs heat from the combustion chamber wall, and cools the combustion chamber convectively as a result. A cooling air return line 10 is connected to the upstream end of the plenum 53. Ater cooling has been carried out, the used cooling air 9 flows into the return line 10, and flows back to the first combustion chamber. Consequently, the cooling air is made available again to the operating process of the gas turbogroup at the pressure level at which it was tapped, and, in addition, the heat which is extracted as a result of cooling the second combustion chamber 5 is efficiently used during the expansion in the first turbine 4 and in the second turbine 6.

Figure 2:
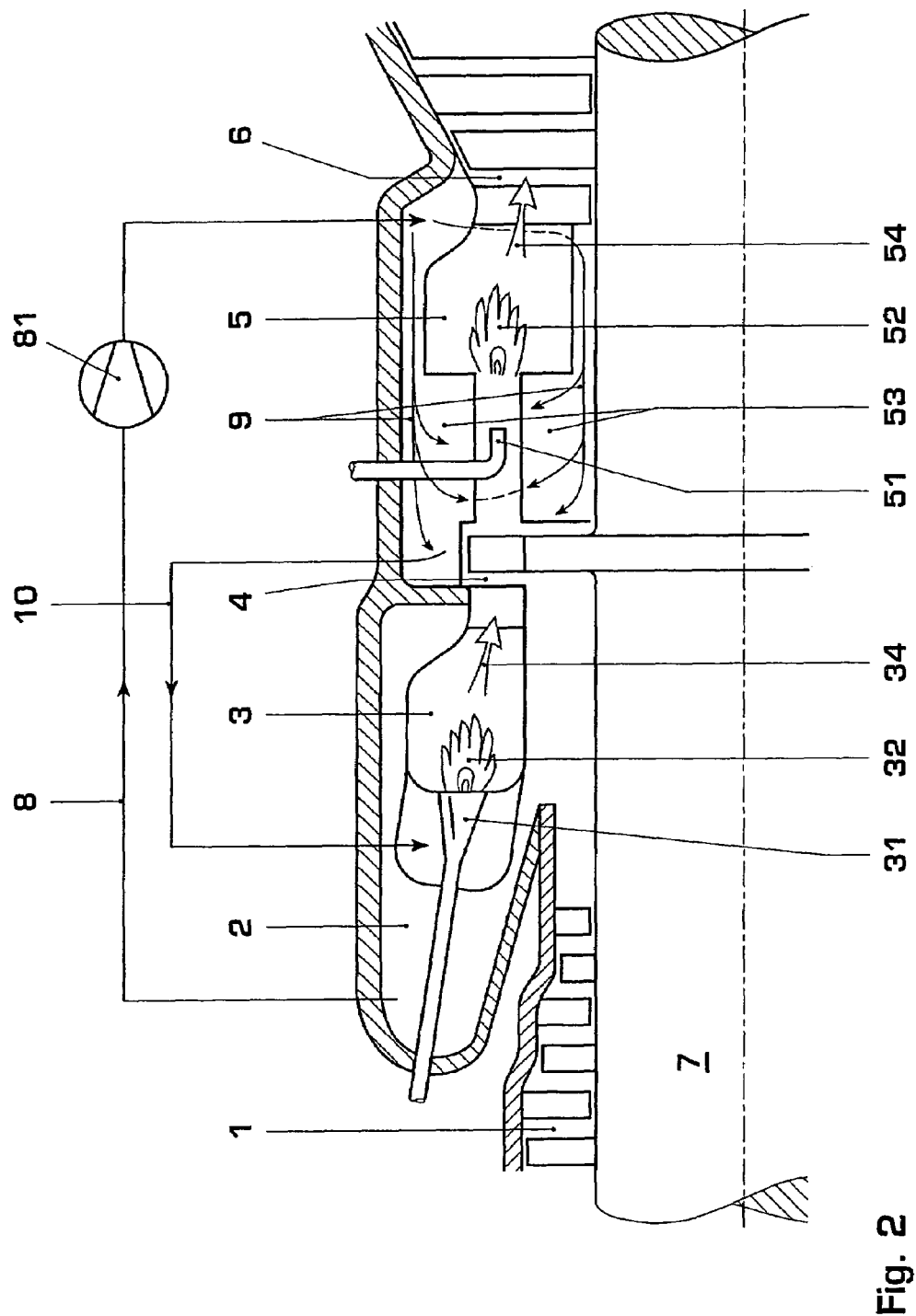
FIG. 2 shows a first development of this embodiment.

In FIG. 2, a development of the device from FIG. 1 is shown. An auxiliary compressor 81, which recompresses the air which is tapped from the plenum 2, and therefore compensates pressure losses which occur in the cooling system, is arranged in the cooling air feed line 8.

Figure 3:
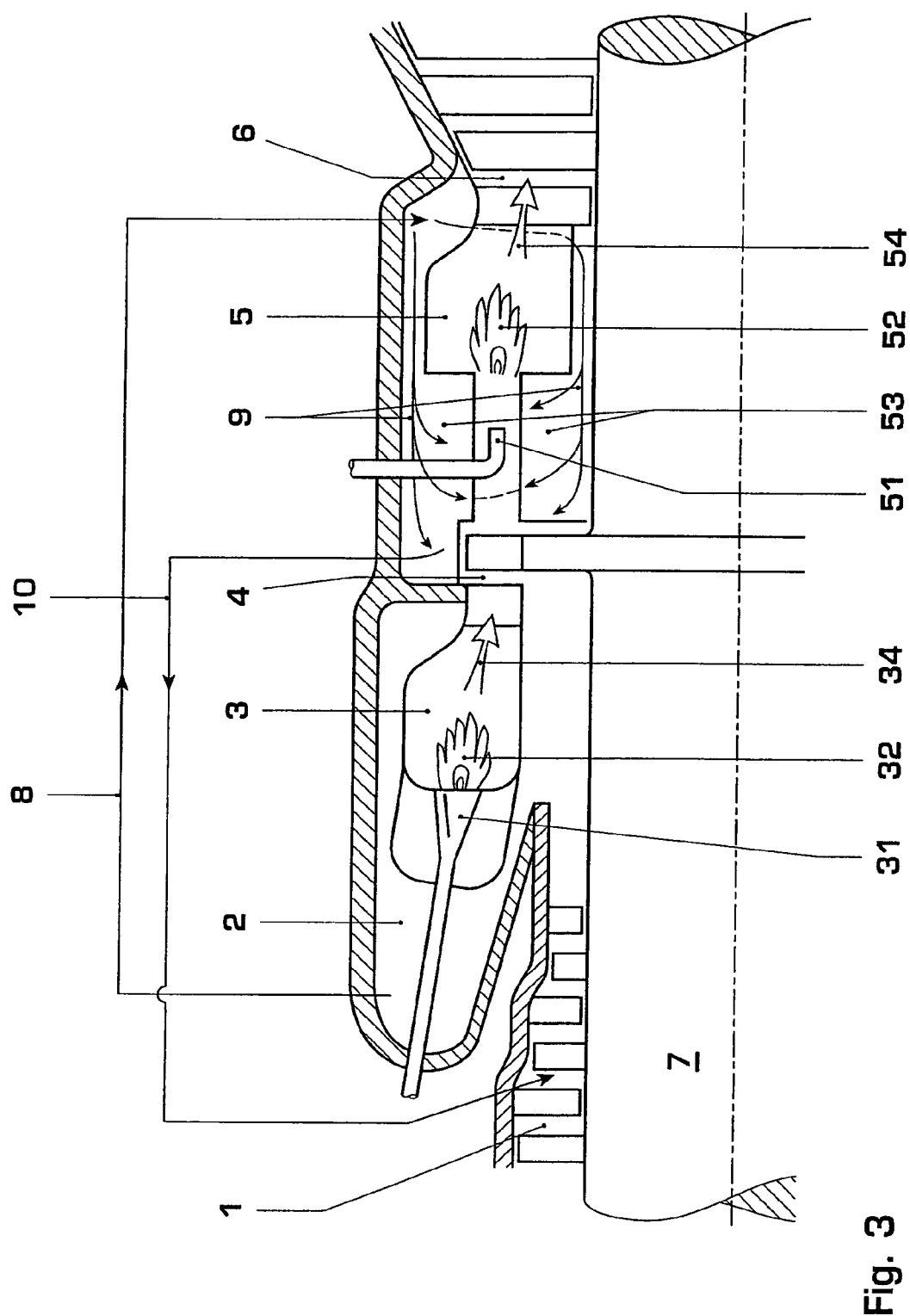
FIG. 3 shows a second development of the disclosure.

Another exemplary embodiment of the disclosure is shown in FIG. 3. This differs from the embodiment of FIG. 1 in that the return line 10 does not lead to the region of the first combustion chamber, but leads to the compressor 1 between the second from last and the third from last compressor stage. The cooling air, which when flowing through the cooling air system has suffered pressure losses, is consequently recompressed. The compression of the already heated air admittedly requires high specific work, but this superficial disadvantage is compensated by the volumetric flow being increased in the last compressor stages, which increases the compressor efficiency.

Figure 4:
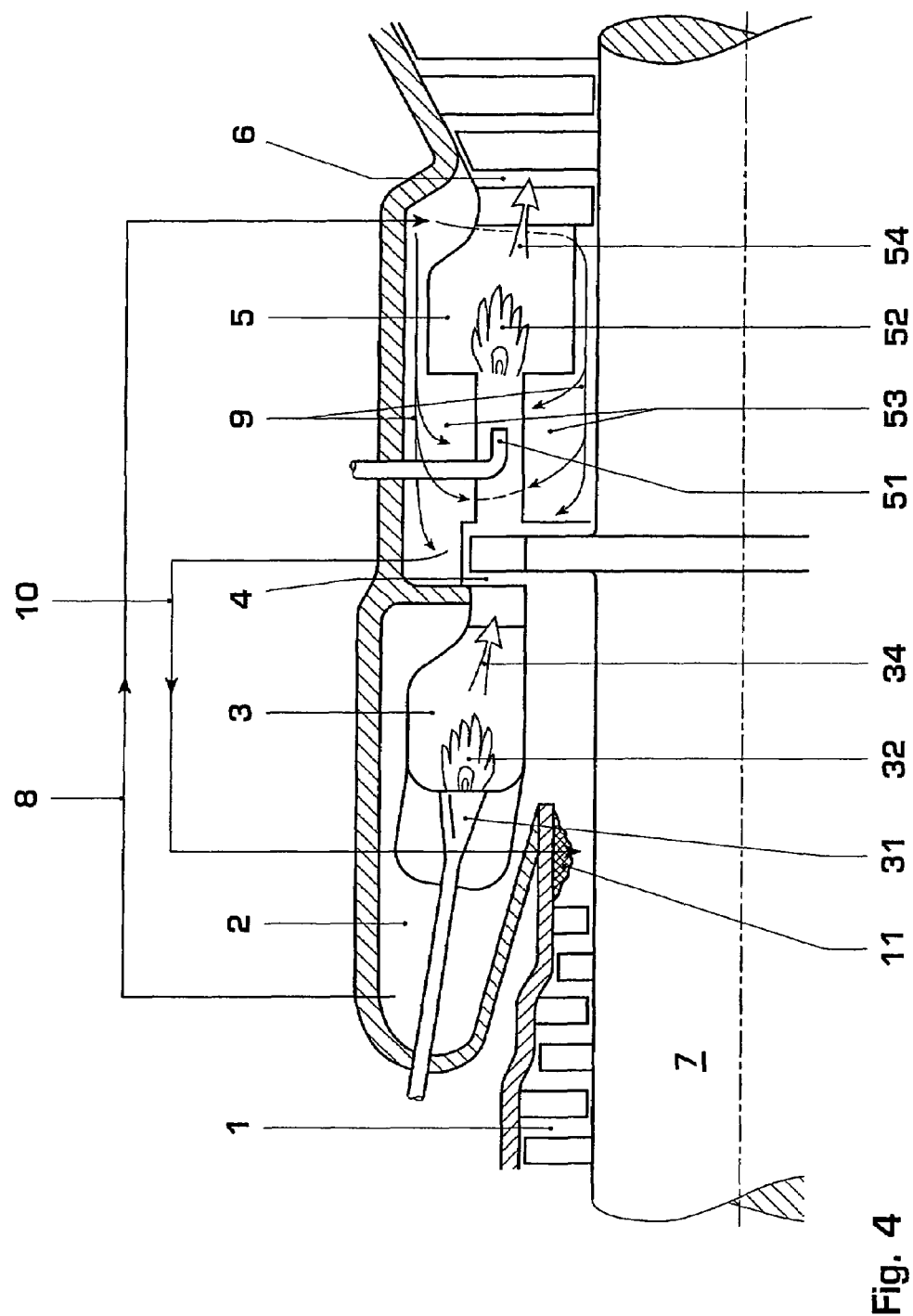
FIG. 4 shows another exemplary embodiment of the disclosure.

With the exemplary embodiment according to FIG. 4, a region of a convergent-divergent cross section 11 is arranged downstream of the compressor. With this, the air which flows from the compressor is first accelerated, as a result of which the static pressure drops, and in the divergent section is decelerated again, wherein the static pressure is regained. The cooling air return line 10 in this embodiment leads to the narrowest cross section of this convergent-divergent region, and therefore in the region of the lowest static pressure, as a result of which the flow of cooling air is ensured despite the pressure losses which occur in the cooling air system.

Although the disclosure was explained in the above based on exemplary embodiments, the person skilled in the art understands that embodiments which are not shown here, and which are readily made apparent to the person skilled in the art in light of the embodiments which are rendered above, are also contained within the scope of the patent claims. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A gas turbogroup, comprising a compressor, a first combustion chamber, a first turbine, a second combustion chamber, and a second turbine, wherein the first combustion chamber is arranged downstream of the compressor, the first turbine is arranged downstream of the first combustion chamber, the second combustion chamber is arranged downstream of the first turbine, and the second turbine is arranged downstream of the second combustion chamber, in which gas turbogroup the second combustion chamber has a convectively cooled wall, wherein a cooling air feed line for the second combustion chamber branches from the main flow path of the gas turbogroup downstream of the compressor and upstream of the first combustion chamber, and wherein a return line for heated cooling air leads from the second combustion chamber upstream of the first turbine to the main flow path.

2. The gas turbogroup as claimed in claim 1, wherein the return line leads to the first combustion chamber.

3. The gas turbogroup as claimed in claim 1, wherein the return line leads to the main flow path upstream of the first combustion chamber.

4. The gas turbogroup as claimed in claim 3, wherein the return line leads to a plenum of the first combustion chamber.

5. The gas turbogroup as claimed in claim 4, wherein the return line of the cooling air leads to burners of the first combustion chamber.

6. The gas turbogroup as claimed in claim 3, wherein the return line of the cooling air leads to burners of the first combustion chamber.

7. The gas turbogroup as claimed in claim 6, wherein the return line of the cooling air is specifically guided to individual burners of the first combustion chamber.

8. The gas turbogroup as claimed in claim 3, wherein the return line leads to the compressor.

9. The gas turbogroup as claimed in claim 1, wherein the return line leads to the compressor, preferably upstream of the last one to four stages.

10. The gas turbogroup as claimed in claim 9, wherein an auxiliary compressor is arranged in the cooling air feed line.

11. The gas turbogroup as claimed in claim 1, wherein an auxiliary compressor is arranged in the cooling air feed line.

12. The gas turbogroup as claimed in claim 11, wherein the return line leads to the region of a flow constriction of a convergent-divergent flow element.

13. The gas turbogroup as claimed in claim 1, wherein the return line leads to the region of a flow constriction of a convergent-divergent flow element.

* * * * *